United States Patent
Lynn et al.

(10) Patent No.: US 10,373,157 B1
(45) Date of Patent: Aug. 6, 2019

(54) COMPUTER SYSTEM FOR ACCELERATING RESOURCE TRANSFERS BASED ON NON-FINALIZED OPERATION INFORMATION

(71) Applicant: Payability, LLC, New York, NY (US)

(72) Inventors: Scott William Lynn, Overland Park, KS (US); Swaminathan Krishnamurthy, San Jose, CA (US); Keith Smith, New York, NY (US)

(73) Assignee: Payability, LLC, New York, NY (US)

( * ) Notice: Subject to any disclaimer, the term of this patent is extended or adjusted under 35 U.S.C. 154(b) by 387 days.

(21) Appl. No.: 15/221,141

(22) Filed: Jul. 27, 2016

Related U.S. Application Data (60) Provisional application No. 62/199,133, filed on Jul. 30, 2015.

(51) Int. Cl.
| G06Q 20/38 | (2012.01) |
| G06Q 20/10 | (2012.01) |
| G06Q 20/40 | (2012.01) |

(52) U.S. Cl.
CPC ......... G06Q 20/3821 (2013.01); G06Q 20/10 (2013.01); G06Q 20/401 (2013.01)

(58) Field of Classification Search
CPC ......... G06Q 20/38; G06Q 20/10; G06Q 20/40
USPC ...................................................... 705/35–45
See application file for complete search history.

(56) References Cited

U.S. PATENT DOCUMENTS

| 7,155,409 B1 | 12/2006 | Stroh |
| 7,617,146 B2 | 11/2009 | Keaton et al. |
| 7,752,096 B2 | 7/2010 | Santalo et al. |
| 8,244,625 B2 | 8/2012 | Holm et al. |
| 8,280,800 B2 | 10/2012 | Samsky et al. |
| 8,326,754 B2 | 12/2012 | Bandych et al. |
| 8,543,475 B2 | 9/2013 | Fox |
| 9,727,912 B1 | 8/2017 | Poursartip et al. |
| 2002/0082985 A1 | 6/2002 | MacKay |
| 2003/0018563 A1 | 1/2003 | Kilgour et al. |

(Continued)

OTHER PUBLICATIONS

Scott William Lynn et al., U.S. Appl. No. 14/738,135, filed Jun. 12, 2015, "Automated Factoring System", 42 pages.

Primary Examiner — Robert R Niquette
(74) Attorney, Agent, or Firm — Moore & Van Allen PLLC; Peter B. Stewart (57) ABSTRACT

A system may include a memory, a processor, a network communication interface, and a module stored in the memory and executable by the processor. The module may be configured to: receive security credentials to receive non-finalized information from a provider, wherein the non-finalized information is associated with an operation completed by the provider on behalf of an entity; establish an operative communication channel with the provider computer system using the security credentials; receive the non-finalized information from the provider; process the received non-finalized information, wherein processing the received non-finalized information comprises calculating an accelerated transfer quantity; transfer the accelerated transfer quantity to the entity; receive finalized information and/or a resource quantity associated with the operation from the provider; determine a finalized transfer quantity owed to the entity by the provider; calculate a reconciled transfer quantity; and transfer the reconciled transfer quantity to the entity.

17 Claims, 3 Drawing Sheets

(56) References Cited

U.S. PATENT DOCUMENTS

| | | | |
|---|---|---|---|
| 2004/0024675 A1* | 2/2004 | Lahre | G06Q 10/04 705/36 R |
| 2004/0044620 A1 | 3/2004 | Iversen | |
| 2004/0181493 A1* | 9/2004 | Cross | G06Q 20/401 705/75 |
| 2005/0283433 A1 | 12/2005 | Reid et al. | |
| 2006/0095374 A1 | 5/2006 | Lo et al. | |
| 2007/0067236 A1 | 3/2007 | Deinhardt et al. | |
| 2007/0156584 A1 | 7/2007 | Barnes et al. | |
| 2007/0226136 A1 | 9/2007 | Treider et al. | |
| 2012/0054097 A1* | 3/2012 | Frohwein | G06Q 20/102 705/40 |
| 2013/0060683 A1 | 3/2013 | Hynes et al. | |

* cited by examiner

COMPUTER SYSTEM FOR ACCELERATING RESOURCE TRANSFERS BASED ON NON-FINALIZED OPERATION INFORMATION

CROSS-REFERENCE TO RELATED APPLICATION

This application claims priority to U.S. Provisional Application Ser. No. 62/199,133, filed Jul. 30, 2015, entitled "Automated Factoring System," the contents of which are hereby incorporated by reference in its entirety.

BACKGROUND

Over the last few years, there has been a significant increase in the number of electronic operations and activities, particularly online and mobile operations due to widespread use of smartphone, tablet computers, laptop computers and electronic computing devices in general. These developments have facilitated numerous methods for resource transfer and utilization. With the continued escalation of electronic operations, novel systems for processing non-finalized operation information of resources, monitoring resource transfers, and accelerating resource transfers based on the non-finalized information are desired.

BRIEF SUMMARY

The present invention is directed to systems, methods, and computer program products that provide accelerated resource transfers to an entity owed by a provider. A factor is enabled to procure receivables associated with the entity that are owed by the provider in exchange for providing the entity with an accelerated resource quantity up front. Calculation of the accelerated resource quantity due to the entity from the factor is typically based on a variety of non-finalized information associated with the entity and the provider.

In one aspect, the present invention embraces a system for providing factoring, automatically, based on non-finalized operation information, the system including a memory; a processor; a network communication interface; and a module stored in memory and executable by the processor. The module is typically configured to: receive security credentials for establishing an operative communication channel with a provider computer system to receive non-finalized information from a provider, wherein the non-finalized information is associated with an operation completed by the provider on behalf of an entity; establish, via the network communication device, the operative communication channel with the provider computer system using the security credentials; receive, via the operative communication channel, the non-finalized information from the provider computer system; process the received non-finalized information, wherein processing the received non-finalized information comprises determining an accelerated transfer quantity based on the received non-finalized information, the accelerated transfer quantity being based on a non-finalized operation quantity owed by the provider to the entity and associated with the operation; transfer the accelerated transfer quantity to the entity; receive finalized information and/or a resource quantity associated with the operation from the provider; process the finalized information and/or resource quantity associated with the operation, wherein processing the finalized information associated with the operation comprises: (1) based on the finalized information and/or resource quantity, determining a finalized transfer quantity owed to the entity by the provider, associated with the operation, and (2) determining a reconciled transfer quantity based on the finalized transfer quantity and the accelerated transfer quantity; and transfer the reconciled transfer quantity to the entity.

In a particular embodiment, the non-finalized information comprises at least an operation quantity; and processing the received non-finalized information comprises determining the non-finalized operation quantity owed by the provider to the entity based on the operation quantity.

In a particular embodiment, or in combination with the previous embodiment, processing the received non-finalized information occurs substantially simultaneously to receiving the non-finalized information.

In a particular embodiment, or in combination with any of the previous embodiments, the finalized information is received after receiving the non-finalized information.

In a particular embodiment, or in combination with any of the previous embodiments, the module is further configured to: determine that the entity has entered into a contract setting forth that the accelerated transfer quantity is provided to the entity; wherein the contract further sets forth that the entity sells its accounts receivable associated with the operation to a factor in exchange for the factor providing the accelerated transfer quantity.

In a particular embodiment, or in combination with any of the previous embodiments, the contract sets forth that the entity sells its future accounts receivable associated with future operations to the factor during a predefined time period in exchange for the factor providing periodic future accelerated transfers to the entity.

In a particular embodiment, or in combination with any of the previous embodiments, wherein the module is further configured to: present a first graphical user interface to an entity computing device of the entity, wherein the graphical user interface is presented to the entity computing device; present an offer to the entity computing device via the first graphical user interface, the offer comprising terms proposing that the accelerated transfer quantity be provided to the entity; and determine that the entity has entered into a contract setting forth that the accelerated transfer quantity is provided to the entity; wherein determining that the entity has entered into the contract comprises determining that the entity computing device has transmitted an acceptance of the offer via the first graphical user interface.

In a particular embodiment, or in combination with any of the previous embodiments, wherein the module is further configured to: calculate a factor quantity; and determine that the entity has entered into a contract setting forth that the accelerated transfer quantity is provided to the entity; wherein the contract sets forth that the accelerated transfer quantity is provided to the entity in exchange for the factor quantity; wherein determining the reconciled transfer quantity is further based on the factor quantity; and wherein the reconciled transfer quantity is equal to the finalized transfer quantity minus the accelerated transfer quantity minus the factor quantity.

The present invention provides many benefits to the entity/vendor. For example, by utilizing systems, methods, and computer program products of the present invention, the entity or vendor can receive an accelerated transfer quantity or accelerated payment amount of funds up front from the factor instead of waiting for resource transfer or payment from the provider. Receiving the accelerated payment amount earlier enables the entity to more appropriately manage its cash-flow-dependent budgets and invest earned revenue in critical aspects of its enterprise.

The present invention provides many benefits to the provider. For example, by integrating its systems with a factoring system in accordance with the present invention, the provider can attract more vendors by offering faster payments to such vendors. In addition, the provider can offer faster payments to vendors without creating a potential cash flow problem for the provider.

BRIEF DESCRIPTION OF THE DRAWINGS

Having thus described embodiments of the invention in general terms, reference will now be made to the accompanying drawings, where:

DETAILED DESCRIPTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

When a vendor or an entity makes sales via a marketplace (e.g., an online marketplace), a payment or resource transfer is thereafter due to the vendor via the marketplace. To facilitate payment to the vendor, the marketplace periodically (e.g., monthly) finalizes sales data and generates a statement showing the sales made and corresponding payment due to the vendor since the last statement. Thereafter, the marketplace makes the payment to the vendor after a predetermined period of time (e.g., 30 days, 60 days, or 90 days). As such, there can be a significant delay between the making a sale via the marketplace and receiving payment or resource transfer for that sale. This delay may result in cash flow problems for the vendor.

Factoring is one technique organizations or enterprises may employ to address cash flow issues. Factoring is an operation in which a third party factor acquires/purchases from a vendor/entity the vendor's accounts receivable at a discount, thereby providing the vendor with a percentage of its accounts receivable in more readily available funds/resources. Thereafter, the third party factor typically bears the risk and responsibility of collecting on the purchased accounts receivable. That said, a need exists for an improved automated factoring system.

The present invention is directed to systems, methods, and computer program products that provide accelerated transfer to an entity. The accelerated transfer, as used herein, typically refers to accelerated payment to an entity (e.g., a vendor, a merchant, a seller, a supplier, a store or business owner, or the like) owed by a provider (e.g., an online marketplace, a retailer, a distributor, or the like). Determination/calculation of an accelerated transfer quantity, also referred to as an accelerated payment amount, due to the vendor is based on a variety of non-finalized information associated with the vendor and the provider. Offers and/or other incentives may be provided to the vendor to incentivize vendor commitment to a one-time accelerated transfer/payment or to a recurring accelerated transfer/payment service.

In some embodiments, the entity or vendor holds a relationship with the provider. Typically, the relationship includes mutually-agreed-upon guidelines (e.g., agreed-upon contract terms), for enabling the vendor to sell (or offer for sale, rent, or purchase, advertise, or the like) an item (e.g., a good, a product, a service, a physical object, information, intellectual property rights, or the like) through distribution channels (e.g., a website, an online store, a mobile application, a digital marketplace, or the like) associated with the provider. The vendor may hold a relationship with one or more providers, and the provider may hold a relationship with one or more vendors.

In exchange for access to the distribution channels associated with the provider, the vendor typically agrees to pay to the provider a provider fee. The provider fee is associated with sales made or transactions (also referred to as "operations") executed by the vendor through the distribution channels associated with the provider. The provider fee may be a predetermined operation quantity/payment amount or a predetermined percentage of a sale or transaction amount determined on a per-transaction basis. The provider fee may also be a one-time fee, either a predetermined payment amount or a predetermined percentage of sales or transaction amounts that is paid upfront (e.g., before the transaction occurs, during vendor registration, or the like) and allows for unlimited vendor sales or transactions through the distribution channels associated with the provider over a predetermined period of time (e.g., a monthly subscription, unlimited use, or the like). The provider fee may also include a combination of a payment amount and a predetermined percentage of sales or transaction amounts.

For example, assume the vendor is a musical artist selling a song via a provider (e.g., a digital music distributor). The artist is required to agree to a yearly contract between the artist and the provider. The contract establishes a provider fee that enables the provider to collect from the artist a $50-per-year membership fee payment amount, as well as 25% of a total amount of funds earned on purchases of the song via the provider.

The provider fee may be configured by the vendor, the provider, a third party (e.g., a website administrator, or the like) real-time market information, or determined by the system of the present invention in real time (e.g., at substantially the same time as execution of the transaction). The provider fee payment amount may be static (e.g., unchanging) or may be dynamic (e.g., variable based on a predetermined tier of pricing, a transaction amount, a purchase price, a redeemed coupon or offer, or the like).

Payment of the provider fee is warranted because not only does the provider provide the vendor with access to a marketplace that may be visited by potential customers (and therefore provides the vendor with access to revenue from sales to these potential customers), the provider also hosts content (e.g., video, audio, images, text, product or contact information, or the like) associated with the vendor. Further, the provider assumes financial responsibility of managing, invoicing, collecting, processing, finalizing and/or distributing payments and funds on behalf of the vendor. Payment of the provider fee from the vendor to the provider may occur at the time of a transaction, or at a predetermined later time.

However, the provider typically finalizes and processes payments owed to the vendor substantially after a sale is made. For example, the provider typically finalizes and processes sales that occurred during a predetermined period of time (e.g., during the previous month) after such period of time (e.g., at the end of each month) in order to generate a financial statement (e.g., an invoice) that is provided to the vendor and shows the amount owed by the provider to the vendor for such period of time. Thereafter, at a later date (typically after a 30-day, 60-day, or 90-day period of time), the provider transfers the amount of funds owed to the vendor as set forth in the financial statement. Delayed finalization and processing of payments creates potential cash flow issues for the vendor because even though the vendor made a sale via the provider on June 2nd, for instance, the vendor typically must wait until the end of June or after (e.g., July 15) to receive a finalized statement from the provider. Furthermore, the vendor must wait even longer (e.g., until October 15) before the provider remits payment associated with the sale to the vendor.

In contrast, an automated factoring system in accordance with embodiments of the present invention provides an accelerated payment from a factor to the vendor before the provider has completed finalizing and processing the amount owed to the vendor. The accelerated payment amount or "accelerated transfer quantity" is typically determined based on non-finalized information associated with one or more transactions that occur over a period of time. The accelerated payment amount may also be based on other information such as the vendor's credit history, the vendor's risk profile, the provider's credit history, the provider's risk profile, customer(s) risk profile, the original payment terms between the vendor and provider (e.g., how quickly the vendor pays amounts owed to the provider), or other information associated with the vendor or provider. This accelerated payment amount may be determined substantially in real time with presenting an accelerated payment offer to the vendor. Ultimately, the systems, methods, and computer program products of the present invention exist to provide quicker payment to the vendor than traditional payment processing methods.

The automated factoring system is typically a software-based system that is associated with a factor that provides an accelerated payment to the vendor owed by the provider. The system determines a factor fee amount (e.g., based on received non-finalized information associated with a transaction, the vendor, the provider, or other information). This factor fee may be calculated substantially in real time with presenting an accelerated payment offer to the vendor, or may be determined in advance based on the contractual agreement between the vendor and the system. Typically, the offer for receiving the accelerated payments is presented to the vendor over a website operated by the factor. However, in other embodiments, the offer may be presented using other communication mediums (e.g. email, advertisement on third part website). The system typically pays the accelerated payment to the vendor before receiving finalized information from the provider. Once finalized information and/or an amount of funds (also referred to as "a resource quantity") associated with a finalized amount or a finalized transfer quantity owed by the provider to the vendor is received from the provider, the system reconciles any differences between the finalized amount owed by the provider, the factor fee, and the accelerated payment amount and pays the vendor a remainder amount of funds.

It should be noted that in some embodiments of the present invention, the system may need to update financial account information with the provider such that payments made by the provider are transferred into an account of the factor. Therefore, the automated factoring system may make distributions to the vendor in accordance with this disclosure. For example, a vendor may enter into an agreement with a factor to receive advance payments. The system updates financial account information with the provider such that the funds due to the provider are paid to an account of the factor. The system then determines an advanced payment amount that is transferred to an account of the vendor. When a payment is released by the provider, it is paid directly to the factor. The system may then make appropriate distributions.

The automated factoring system represents an improvement in technology by presenting advance payment offers to vendors based on real-time non-finalized information and subsequently receiving acceptance (e.g., in real time) of the offer to facilitate quicker payment to the vendor than is possible traditional payment processing methods. Indeed, receiving security credentials of the vendor allows the factoring system to integrate with the provider system to receive information relating to transactions, completed by the vendor over the provider system.

Figure 1A:
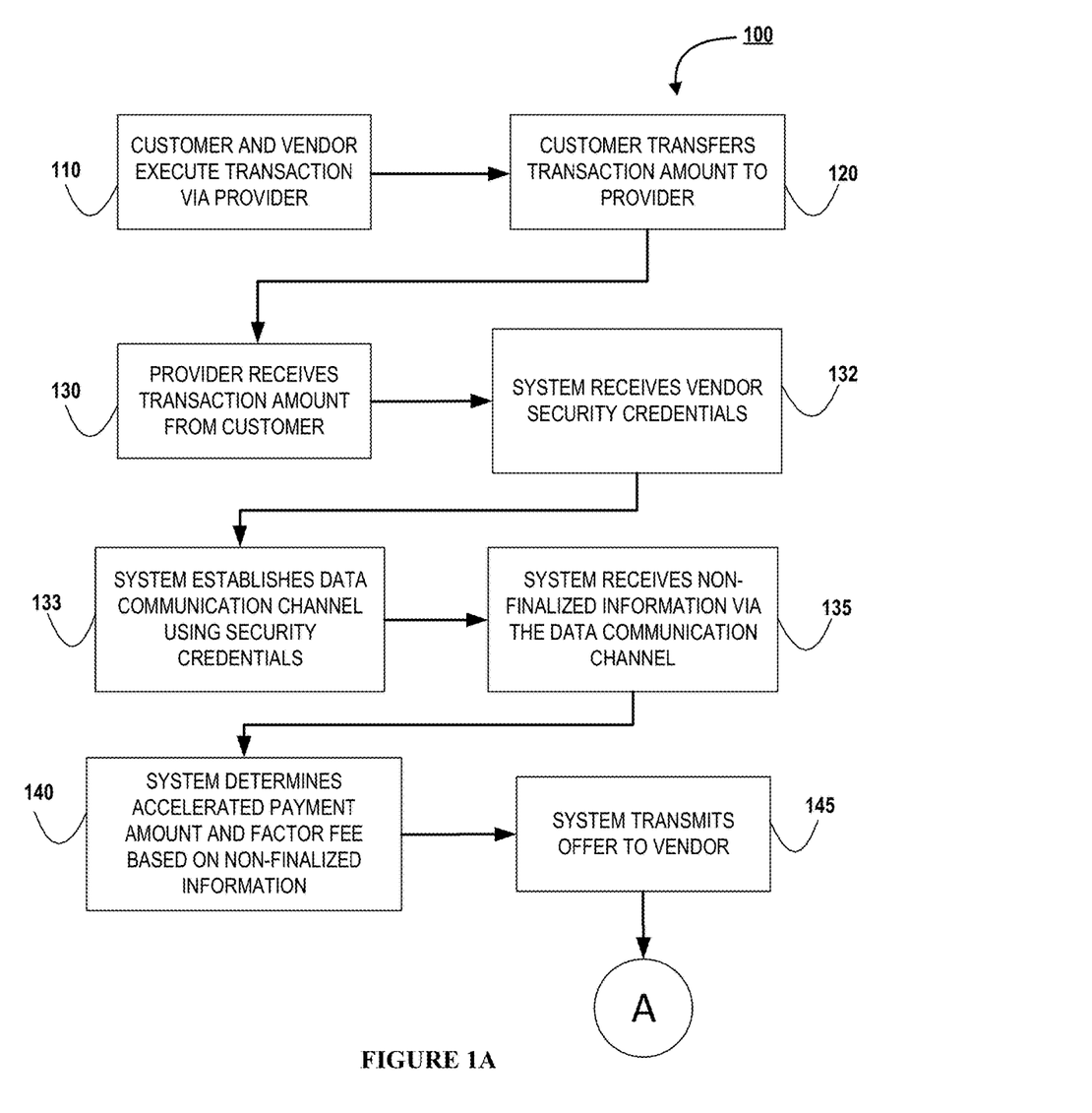
FIG. 1A is an exemplary process flow illustrating an operation timeline of an automated factoring system in accordance with embodiments of the present invention.
Figure 1B:
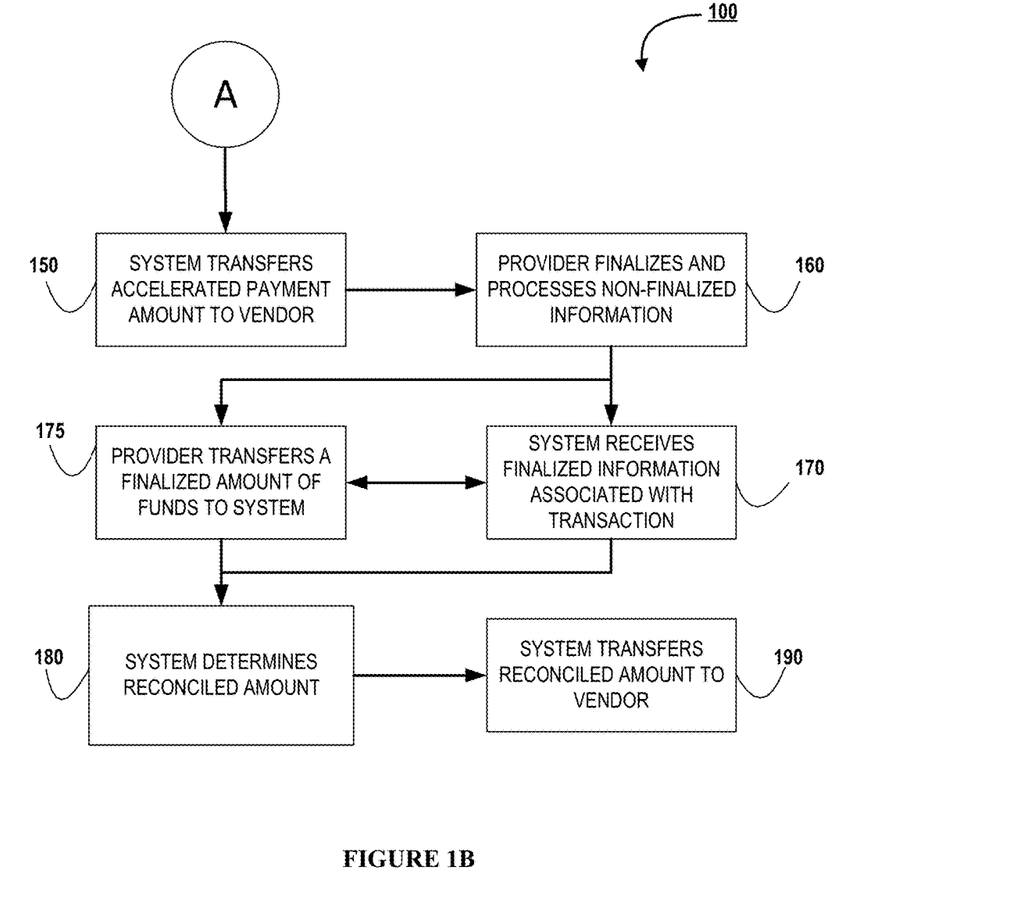
FIG. 1B is an exemplary process flow further illustrating the operation timeline illustrated in FIG. 1A in accordance with embodiments of the present invention.

Now referring to the Figures, FIG. 1A and FIG. 1B illustrate an exemplary operation timeline 100 associated with an automated factoring system in accordance with an aspect of the present invention. At block 110, a customer and an entity/vendor execute an operation or a transaction (e.g., the customer makes a purchase, a rental, a plurality of transactions, views an advertisement, or the like), typically through a marketplace (e.g., an online retail store, or the like) associated with a provider. At block 120, the customer typically transfers a transaction amount or operation quantity (e.g., a purchase amount) to the provider on or after the transaction (e.g., substantially simultaneously to making a purchase or at a predetermined time after making a purchase). The transaction amount is typically transferred from an account associated with the customer to an account associated with the provider.

At block 130, the transaction amount is received into an account associated with the provider (e.g., substantially simultaneously to the transaction amount transfer).

In an alternative embodiment, the transaction is not a purchase by the customer, but instead is an interaction between the customer and the provider in which an amount owed by the provider to the vendor/entity is accrued based on the interaction. For example, the interaction may be an ad impression (e.g., the customer may click on an advertisement of the provider that is displayed on a website associated with the vendor). Under such a scenario, the customer does not transfer a transaction amount to the provider. Instead, an amount owed to the vendor by the provider may accrue based on the ad impression.

The provider, based upon the transaction and/or receipt of the transaction amount or an amount that accrues as a result of the transaction, receives and/or generates non-finalized information associated with the customer, the vendor, and/or the provider. For example, this non-finalized information may be enterprise or business data such as sales volume data, transaction volume data, approximated revenue, transaction information (e.g., transaction amount), and the like. The information is non-finalized because the provider has not finalized or finished processing the information or payments associated with the transaction (e.g., to create accounts receivable, accounts payable, invoices, or the like). Processing typically occurs at a later date (e.g., at the end of the month or a predetermined period of time such as 30 days, 60 days, 90 days, or the like) and is discussed below. This processing typically results in adjustments to the non-finalized information (e.g., due to fraud, returns, calculation errors, and the like).

At block 132, the system receives entity/vendor security credentials from the vendor to receive non-finalized information associated with the transaction. In some embodiments, the security credentials are received after the vendor has entered into a contract with the factor or accepted the terms for an accelerated payment offer. The security credentials enable the system to communicate with the provider system to receive the non-finalized information. The system may store the security credentials to enable the system to communicate with the provider system at future periods of time. For example, where the vendor and the factor enter into a long-term agreement, the vendor may use the security credentials on a regular basis (e.g. daily, weekly, monthly) to receive transaction information from the provider system.

In some embodiments, the security credentials may be information necessary to create a connection with the provider system. The security credentials may include, but are not limited to, a username, a password, a key, biometric information, and the like.

At block 133, using the security credentials, the system establishes an operative communication channel with the provider system using a network communication device of the system, the operative communication channel being configured to transmit data and control instructions. The operative communication channel may be a link established between the system and an Application Program Interface (API) of the provider system, using a network communication device of the system. For example, the provider system may be configured to receive requests over a network connection for providing information associated with the vendor, such as non-finalized or finalized information as discussed herein. After the non-finalized information is received, the system may terminate the operative communication channel. In other embodiments, the provider system may be configured to communicate the non-finalized information to the system after the security credentials have been communicated to the provider system. For example, the system may initially communicate the security credentials to the provider system and close a data channel used to communicate the security credentials. Afterwards, the system may establish a subsequent operative communication channel with the provider system to receive the information. In some embodiments, the operative communication channel may remain open so information may be transferred in near real-time. In other embodiments, the system establishes the operative communication channel with the provider system to facilitate receiving the information.

In some embodiments, the security credentials may enable the system to update financial account information associated with the vendor and used by the provider system to send payments to the vendor. In such embodiments, the system may update the financial account information such that the provider pays any payments owed to the vendor to an account managed by the factor. Thus, the factor may distribute funds as described herein. This financial account information described herein may be part of vendor information used with the provider.

At block 135, the system, which is typically operated by or associated with a factor, receives the non-finalized information associated with the transaction from the provider. Such information may be transmitted over the operative communication channel established between the system and the provider system. In some embodiments, the non-finalized information is transmitted to the system substantially simultaneously with the transaction. In other embodiments, the non-finalized information is transmitted after receiving the transaction amount (e.g., as shown in FIG. 1A). The received non-finalized information may also include information associated with other transactions (e.g., an aggregated non-finalized quantity or amount owed to the vendor by the provider based on a plurality of transactions or accrued over a period of time).

In this regard, the system is configured to receive non-finalized (and later finalized) information associated with the customer, the vendor, the provider, and/or the factor, or other information at various times during operation. The received information may include contact information (e.g., a name, an identification (ID), a phone number, an email address, a physical address, a social security number, an employer identification number (EIN), or the like), account information (e.g., an account number, a routing number, an account balance, an account type, information associated with a financial institution, or the like), location information (e.g., a store location, a physical address, global positioning system (GPS) coordinates, an Internet Protocol (IP) address, longitude and latitude, a zip code, or the like), transaction information (e.g., a transaction amount, a transaction type, an invoice, a receipt, a transaction date and time, or the like), preferences (e.g., a transaction history, a calculated accelerated payment fee amount, or the like), finance system data, enterprise data, or the like. As noted, the received information, including transaction information, is typically non-finalized (e.g., raw, unverified, and/or incompletely processed information). That said, in other embodiments, the received information may include finalized financial information (e.g., regarding an amount owed to the vendor by the provider based on one or more transactions). The system is also configured to transmit information to the customer, the vendor, the provider, and/or the factor.

Once received, at block 140, the system processes the non-finalized information in order to determine an accelerated payment amount or accelerated transfer quantity, and a factor fee or factor quantity. The accelerated payment amount and factor fee may be generated in order to present an accelerated payment offer to the vendor. Alternatively, the accelerated payment amount and factor fee may be generated pursuant to a pre-existing agreement (e.g., between the factor and the vendor). The non-finalized information may be processed substantially simultaneously to receiving the non-finalized information and/or in conjunction with presenting an accelerated payment offer to the vendor, such as substantially simultaneously (e.g., in real time) with presenting an accelerated payment offer to the vendor and based on the most up-to-date non-finalized information. In typical embodiments, pieces of the non-finalized information may be received by the system at different times (e.g., over time in conjunction with the occurrence of multiple transactions). In this regard, a previously calculated accelerated payment amount and factor fee may be updated based on newly received non-finalized information.

Processing the received non-finalized information includes calculating a factor fee, which is a service premium typically paid by the vendor to the factor associated with the system of the present invention in exchange for receiving an accelerated payment on accounts receivable associated with the vendor and due from the provider. For example, the factor fee may be that the factor earns 5% of an amount owed to the vendor (e.g., an amount determined using the non-finalized information associated with one or more transactions) in exchange for providing the vendor with 75% of the amount owed as an accelerated payment (e.g., before the provider finalizes all accounts payable), and a remaining balance amount after finalization is completed. As described below, the factor typically receives the full 100% of a finalized amount, which is typically equal to the transaction amount(s) minus the provider fee and subject to any adjustments (e.g., due to fraud, returns, calculation errors, and the like), from the provider after the accounts payable associated with the provider have been finalized. In other embodiments, the factor fee may be paid by the provider (e.g., the provider may subsequently provide the factor with the factor fee in addition to a finalized transfer quantity or finalized amount owed to the vendor).

The factor fee is typically calculated based on the received non-finalized information, as well as other information or inputs received by the system. For example, the factor fee may be calculated based on a combination of variables, including but not limited to risk profiles associated with the vendor, the provider and/or customer(s), vendor, provider and/or customer(s) credit information, the original payment terms between the vendor and provider (e.g., how quickly the vendor pays amounts owed to the provider), a history of transactions associated with the vendor and/or the provider (e.g., accuracy of non-finalized information, percentage of accounts receivable paid by the provider, and/or percentage of accounts receivable collected by the vendor), an amount of the accelerated payment, a vendor type, a transaction amount, or the like. For example, if the vendor and/or provider have low risk profiles and good transaction histories, then the factor fee may be lower than if the vendor and/or provider had higher risk profiles and poorer transaction histories. By way of further example, the factor fee may be lower if the original payment terms between the vendor and provider set forth quicker payments from the vendor (e.g., after 30 days), but may be higher if the original payment terms provide for later payments from the vendor (e.g., after 90 days). Data regarding such variables may be collected and/or retrieved by the system. The factor fee is typically a percentage of an amount owed by the provider to the vendor (e.g., accrued during a predetermined period, such as on a monthly basis) based on non-finalized information regarding one or more transactions. In other embodiments, the factor fee may be a fixed amount of funds or a combination of a percentage and a fixed amount. In some embodiments, the factor fee is associated with the transaction and is calculated on a per-transaction basis. In other embodiments, the factor fee is calculated based on a one-time service premium associated with a predetermined period of time. For example, the factor fee may be a one-time service premium that secures a static factor fee for an unlimited number of transactions executed by the vendor via the provider during the month of June. Alternatively, the factor fee may be variable depending on received non-finalized or finalized information, fluctuations in global markets, or the like. The factor fee also may be recalculated or renegotiated after a predetermined period of time (e.g., at the end of each month, or the like). In some embodiments, the factor fee may include transaction fees or any other costs imposed by third parties as a result of any of the transactions contemplated herein.

Processing the received non-finalized information further includes calculating an accelerated payment amount. The accelerated payment amount is the amount of funds that the factor, via the system of the present invention, initially pays to the vendor. The accelerated payment amount is typically calculated by the system based on non-finalized information associated with transactions executed between the customer and the vendor and received from the provider. Accordingly, the vendor can receive an accelerated payment for transactions that occurred during a time period (e.g., month) based on non-finalized information (e.g., real time sales or transaction data) associated with such transactions before the provider generates an accounts payable or other finalized financial information for such time period. The accelerated payment amount is typically a percentage (e.g., 70%) of an amount owed by the provider to the vendor (e.g., accrued during a predetermined period, such as on a monthly basis) based on non-finalized information regarding one or more transactions (e.g., transactions that occurred during such time period). By providing an accelerated payment amount that is a percentage of the non-finalized amount owed to the vendor, the risk of adjustments (e.g., due to fraud, returns, calculation errors, and the like) to the amount owed to the vendor when this amount is finalized can be mitigated. In some embodiments, the accelerated payment amount is a fixed amount of funds or a combination of the fixed amount and a percentage of the amount owed to the vendor. The accelerated payment amount may be further based on a combination of other variables, including but not limited to risk profiles associated with the vendor, provider, and/or customer(s), vendor, provider, and/or customer credit information, the original payment terms between the vendor and provider (e.g., how quickly the vendor pays amounts owed to the provider), a history of transactions associated with the vendor and/or the provider (e.g., accuracy of non-finalized information, percentage of accounts receivable paid by the provider, percentage of accounts receivable collected by the vendor, historical rates of subsequent adjustments to non-finalized information when such information is finalized, and the like), a vendor type, or the like. For example, if the vendor and/or provider have low risk profiles and good transaction histories, then the accelerated payment amount may be higher than if the vendor and/or provider had higher risk profiles and poorer transaction histories. By of further example, a vendor that collects 98% of their accounts receivable (or expected accounts receivable) from a provider may be eligible for an accelerated payment equal to 80% of expected accounts receivable calculated based on non-finalized information, whereas another vendor that collects 90% of their accounts receivable (or expected accounts receivable) from the same provider may be eligible for an accelerated payment equal to 70% of expected accounts receivable calculated based on non-finalized information. Data regarding such variables may be collected and/or retrieved by the system. The accelerated payment amount is typically calculated substantially simultaneously to calculating the factor fee.

Processing the received non-finalized information may also include generating one or more reports based on the non-finalized information. For example, such reports may show accounts receivable or expected accounts receivable for the vendor. Such reports may then be provided to the vendor, the provider, the factor, and/or the customer(s).

At block 145, once the accelerated payment amount or accelerated transfer quantity and the factor fee/quantity have been calculated, the system typically presents the accelerated payment amount and the factor fee to the vendor in the form of an offer. The offer also typically defines terms for receiving, transmitting, processing, or collecting payments, fees, funds associated with accounts receivable, or the like associated with the vendor. The offer may also define a timeline associated with when payments and fees are due. The offer typically sets forth that rights to accounts receivable corresponding to the amount owed by the provider to the vendor will be transferred to the factor. For example, in exchange for providing the vendor with the accelerated payment associated with a transaction or a plurality of transactions, the factor purchases all accounts receivable associated with those transactions, and thereafter the factor receives funds associated with all of the accounts receivable from the provider.

The offer is typically presented to the vendor via a website associated with the factor. The website may present a graphical user interface (GUI) that enables the vendor to enter into a contractual relationship with the factor. Additionally, the GUI may further enable the vendor to supply financial information to receive advanced payments and reconciled payments. While yet in other embodiments, the GUI may present the vendor with payments information which may include the non-finalized and finalized data, information directed to advanced payments and reconciled payments, and the like. In other embodiments, the offer may be presented to the vendor via a message (e.g., an email, instant message, social media message, SMS message, and/or the like). The offer may also be presented to the vendor via a mobile application associated with a mobile device (e.g., a smartphone, a tablet, a wearable device, or the like), a written proposal, or via other means.

In one embodiment, the system may choose to extend a previous contract entered into with the vendor. In this regard, the vendor may have previously received an accelerated payment for an amount owed to the vendor that accrued during a first time period (e.g., month). The system may offer to extend the terms of the previous contract (e.g., factor fee, percentage of non-finalized amount/resource quantity provided as an accelerated payment/transfer quantity, timing of accelerated payment, and the like) to a subsequent time period. Accordingly, the vendor may receive an accelerated payment for an amount owed to the vendor that accrued during a subsequent time period but otherwise in accordance with the terms of the previous contract. In some instances, the terms of the previous contract (e.g., factor fee/factor quantity or percentage of non-finalized amount provided as an accelerated payment) may be modified based on changing circumstances (e.g., the vendor or provider risk profile, newly received information associated with the vendor, the provider, the factor, the customer(s), or the like).

In other embodiments, the contract may be a long term contract, in which the factor and the vendor agree to accelerated payments on a periodic bases (e.g. monthly). The contract may be signed for any period of time or may be perpetual. Generally a long term contract may be signed before any advanced payments are made. When the contract is formed, the factor and the vendor may begin performing duties under the contract.

In another embodiment, the system may provide an offer to the vendor that enables the vendor to enter into an extended (e.g., multi-month) commitment with the system (and therefore enter into an associated contract with the factor) of receiving regular accelerated payments (e.g., before associated finalized information is available from the provider). Under such a scenario, the system regularly (e.g., monthly) calculates an accelerated payment amount that corresponds to an amount owed to the vendor by the provider and which has accrued since the previous accelerated payment. For example, at the end of each month the system may determine an amount owed to the vendor by the provider for transactions during that month (e.g., based on non-finalized information associated with such transactions). This determined amount owed to the vendor is then used to calculate that month's accelerated payment. Accordingly, in this particular embodiment, once the vendor has entered into an extended commitment with the system of receiving regular accelerated payments (e.g., by accepting a corresponding offer provided by the system), the system may repeat the steps described herein with respect to blocks 133-140 and 150-190 (but not block 145) for each regular accelerated payment to the vendor. In this regard, once the vendor has entered into an extended commitment with the system, the terms of such extended commitment govern the regular accelerated payments, and so the system typically does not present further offers to the vendor related to the future regular accelerated payments. An extended commitment may provide for a discounted factor fee as compared with a one-time accelerated payment. For example, the system may provide an offer that allows the vendor to choose between a one-time accelerated payment with a factor fee of 5% and a twelve-month extended commitment of monthly accelerated payments with a factor fee of 2%.

In some embodiments, offers with substantially the same terms may be offered to multiple vendors associated with the same provider.

The system typically provides an interface (e.g., a graphical user interface) to the vendor that enables the vendor to accept the offer. Acceptance of the offer includes registration of (e.g., creating an account, signing up, or the like) the vendor to the system. Such an interface may be provided via the factor's website (or other graphical user interface presented by the system to the vendor) or by clicking a link provided in an offer message. The interface typically provides a way (e.g., an accept offer button) for the vendor to accept the offer (e.g., to transmit an acceptance of the offer to the system). The interface may also present terms of the offer to the vendor.

Acceptance of the offer by the vendor results in a contract (e.g., between the factor and the vendor) pursuant to the terms of offer. Agreement to the contract terms may include registration of the vendor with the system of the present invention.

Once the vendor agrees to the contract terms, the system is typically configured to transmit the accelerated payment amount of funds or accelerated transfer quantity to the vendor as illustrated at block 150. The accelerated payment amount of funds may be transmitted substantially simultaneously to the vendor agreeing to the contract. Alternatively, the accelerated payment amount of funds may be transmitted at later date pursuant to the terms of the contract.

It should be noted that the vendor and the factor may enter into an agreement prior to the factor receiving security credentials from the vendor or providing an accelerated payment to the vendor. In other embodiments, the system may receive the security credentials to determine a transaction history of the vendor prior to entering into a contract with the vendor. Such transaction history may be used to determine terms of the contract.

The accelerated payment amount of funds is transferred from an account associated with the factor and deposited into an account associated with the vendor. Information associated with the vendor's account may be provided to the system at the time the vendor accepts the offer/contract. The account associated with the factor and the account associated with the vendor, as well as an account associated with the provider, may be associated with a financial institution.

In some embodiments, the system is responsible for transmitting the accelerated payment. In other embodiments, a financial institution or a third party financial distributor is responsible for transmitting the accelerated payment. The accelerated payment may be transmitted electronically via a funds transfer, a deposit, cash, or another method. Once the accelerated payment amount of funds is received in the account associated with the vendor, the vendor may use the accelerated payment amount of funds at its discretion.

After a predetermined period of time (e.g., 30 days, 60 days, 90 days, on the last day of the month, or the like), at block 160, the provider completes finalization and processing of transaction information or operation information associated with the accelerated payment or accelerated resource transfer. For example, the accelerated payment may have been made to the vendor on June 25 based on sales volume data from June 1-24. Thereafter, on July 15, the vendor may process sales data for the month of June in order to generate a finalized amount owed to the vendor for the entire month of June.

Upon completion of processing and finalization, at block 170, the provider typically transmits to the system finalized information, which typically includes a finalized amount of funds or resource quantity to be paid/transferred, a financial statement, an invoice, or the like. Such information may be communicated over the operative communication channel as described herein. The invoice may include a notice to the factor that the finalized amount of funds associated with the vendor's accounts receivable associated with the accelerated payment will be paid by the provider to the system within a predetermined period of time (e.g., within 30, 60, or 90 days). In some embodiments, the finalized information is transmitted from the provider and to the system substantially simultaneously to finalization and processing of all accounts. In another embodiment, the finalized information is transmitted from the provider and to the system after a finalized amount is transferred from the provider to the system. The finalized information may also be transmitted substantially simultaneously to the transfer of a finalized amount of funds from the provider to the system. The finalized information may also be transmitted to the vendor. In some embodiments, the finalized information may not be provided to the system.

In some embodiments, the finalized information may include an approval from the provider of the accelerated payment amount (e.g., instead of receiving a finalized amount of funds to be paid, a financial statement, an invoice, or the like). Based on such an approval, the system may calculate a finalized amount of funds to be paid (e.g., based on the approved accelerated payment amount).

After the predetermined period of time, the provider distributes the finalized amount of funds (also referred to as a finalized resource quantity) to the factor (e.g., to the system) as seen in block 175 of FIG. 1B. The finalized amount of funds or resource quantity is typically an amount of funds equal to the sum of transaction amounts occurring during a certain time period (e.g., the previous month) minus the provider fee and subject to any adjustments (e.g., due to fraud, returns, calculation errors, and the like). If the provider is responsible for paying the factor fee, the factor fee may be added to the finalized amount of funds distributed to the factor. The finalized amount of funds is transferred from the account associated with the provider and deposited into the account associated with the factor. In some embodiments, the system does not receive finalized information from the provider and instead only receives the finalized amount of funds from the provider.

At block 180, the system, upon receiving the finalized amount of funds or resource quantity, and/or the finalized information from the provider, is typically configured to reconcile all payments/transfers, information, and invoices associated with the transaction (or a plurality of executed transactions). Included in reconciliation is processing of the received finalized information and/or finalized amount of funds in order to determine a reconciled transfer quantity, also referred to as a reconciled amount of funds, which is still to be owed to the vendor. In some embodiments, the reconciled amount of funds equals zero because the contract terms define that the accelerated payment amount is the only amount of funds that is to be received by the vendor. However, in typical embodiments, the reconciled amount of funds is greater than zero because the factor fee and the provider fee are typically small enough that the vendor is entitled to receive a second portion of the transaction amount in addition to the accelerated payment amount. The reconciled amount is typically calculated based on received finalized and/or non-finalized information as well as other payment or transaction amounts and fees. That said, if finalized information is not provided to the system, the reconciled quantity or amount may be calculated based on the received finalized resource quantity or amount of funds. Before, determining the reconciled amount, and based on the received finalized information and/or the finalized amount of funds, the system typically determines a finalized amount owed to the vendor by the provider. In this regard, this finalized amount is typically equal to the sum of transaction amounts occurring during a certain time period (e.g., the previous month) minus the provider fee and subject to any adjustments (e.g., due to fraud, returns, calculation errors, and the like). In some embodiments, this finalized amount is equal to a received finalized amount of funds. In another embodiment, the finalized amount may be included in received finalized information. In yet another embodiment, the finalized amount may be calculated by the system based on received finalized information. Based on this finalized amount, the reconciled amount of funds can be determined. Typically, the reconciled amount of funds equals the finalized amount minus the accelerated payment amount of funds and minus the factor fee. That said, in some embodiments the factor fee is paid by the provider and, thus is not subtracted from the finalized amount in determining the reconciled amount. Reconciliation typically occurs after receiving the finalized amount of funds and/or the finalized information from the provider, but may also occur substantially simultaneously to receiving finalized information (e.g., before receiving the finalized amount of funds), or at a predetermined later time. In one exemplary embodiment, the reconciled amount may be determined based on received finalized information and before the provider transfers the finalized amount of funds.

Processing the received finalized information may also include generating one or more reports based on the finalized information. For example, such reports may show accounts receivable for the vendor, as well as any reconciled amount owed to the vendor. Such reports may then be provided to the vendor.

At block 190, the system is then configured to transfer (or remit) the reconciled amount of funds or reconciled transfer quantity to the vendor substantially simultaneously to or after determining the reconciled amount of funds. The reconciled amount of funds is transferred from the account associated with the factor and deposited into the account associated with the vendor. If the reconciled amount is determined based on received finalized information and before the provider transfers the finalized amount, the reconciled amount may be transferred to the vendor before the provider transfer the finalized amount to the system.

Authentication may be required by the system at various times during operation of the system. The system prompts the vendor, the provider, and/or the factor for at least one authentication credential (e.g., a password, a passcode, a username, a personal identification number (PIN), an answer to a security question, a biometric input, readable indicia, a gesture, a user input, or the like). The system receives the at least one authentication credential and compares the received at least one authentication credential to a plurality of authentication credentials associated with authentication. The system determines at least a partial match between the at least one authentication credential and the plurality of authentication credentials associated with authentication. Based on determining a match, the system authenticates the vendor, the provider, and/or the factor and executes an action in response. If no match is determined between the at least one authentication credential and the plurality of authentication credentials associated with authentication, the system may prompt the vendor, the provider, and/or the factor for another authentication credential or deny the vendor, the provider, and/or the factor from execution of an action. In one embodiment, authentication credentials provided by a vendor to the provider (e.g., to facilitate the vendor's access to the provider's website) may be further provided to the system to allow the system to authenticate the identity of the vendor. In a particular embodiment, once the identity of the vendor has been authenticated by the system, a security token may be created and provided (e.g., to the provider or vendor by the system). The security token may be created based on authentication credentials of the vendor and/or supplier and may be valid for a defined of time. Once created, this security token may then be subsequently used to authenticate the identity of the vendor.

The system of the present invention may be integrated with a third party provider of financial or enterprise data, or the like, or may exist as a standalone digital service platform. The system of the present invention may also be integrated with a third party associated with fraud detection and prevention or making payments (e.g., using an automated clearing house (ACH)). In some embodiments, the system of the present invention is associated with or has access to a third party or provider application programming interface (API). In some embodiments, an API may be used to integrate the system of the present invention with an existing online marketplace, a third party provider of financial or enterprise data, or the like.

Figure 2:
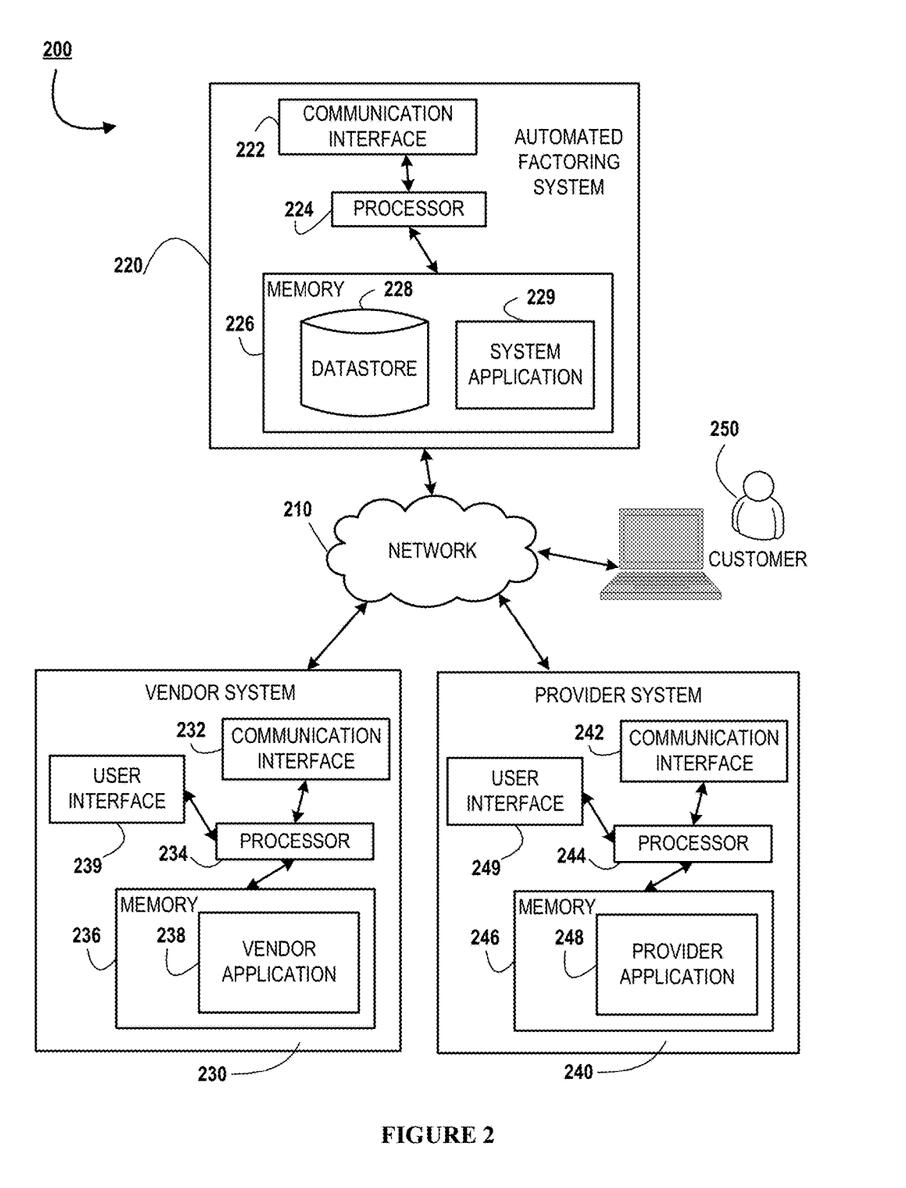
FIG. 2 is a system diagram for an automated factoring system in accordance with embodiments of the present invention.

FIG. 2 is an exemplary block diagram illustrating technical components of a system environment 200 configured to operate an automated factoring system 200 that includes means for calculating a factoring fee based on non-finalized transaction information in real time as described in the process flow described in FIG. 1A and FIG. 1B. As illustrated, the system environment 200 includes a network 210, an automated factoring system 220, a vendor system 230, a provider system 240, and a customer 250. The automated factoring system 220, the vendor system 230, the provider system 240, and the customer 250 may include or be associated with any computing device associated with the factor, the vendor, the provider, and/or the customer. The vendor and/or the provider may utilize the vendor system 230, the provider system 240, to execute a vendor application 238 and/or a provider application 248 respectively. The vendor application 238 and/or a provider application 248 may be an application to communicate with the automated factoring system 220 or the customer 250 via the network 210, execute a transaction, input information onto a user interface presented on the vendor system 230, the provider system 240, or the like. The system application 229, the vendor application 238 and/or a provider application 248 may incorporate one or more parts of any process flow described herein.

As shown in FIG. 2, the automated factoring system 220, the vendor system 230, the provider system 240, and the customer 250 (or a device associated with the customer) are each operatively and selectively connected to the network 210, which may include one or more separate networks. In addition, the network 210 may include a telecommunication network, local area network (LAN), a wide area network (WAN), and/or a global area network (GAN), such as the Internet. It will also be understood that the network 210 is secure and may also include wireless and/or wireline and/or optical interconnection technology.

The automated factoring system 220, the vendor system 230, the provider system 240, and the customer 250 may include any computerized apparatus that can be configured to perform any one or more of the functions of the automated factoring system 220, the vendor system 230, the provider system 240, and the customer 250 described and/or contemplated herein. For example, the vendor system 230, the provider system 240, and the customer 250 may transmit and/or receive information or commands to and from the automated factoring system 220. The automated factoring system 220, the vendor system 230, the provider system 240, and the customer 250 may also include multiple devices associated with multiple respective users (e.g., each of the factor, the vendor, the provider, and/or the customer). In some embodiments, for example, the automated factoring system 220, the vendor system 230, the provider system 240, and the customer 250 may include a personal computer system (e.g. a non-mobile or non-portable computing system, or the like), a mobile computing device, a personal digital assistant, a mobile phone, a tablet computing device, a network device, a wearable computing device, a sensor, a point-of-sale (POS) device, and/or the like.

FIG. 2 also illustrates the automated factoring system 220, in accordance with an embodiment of the present invention. The automated factoring system 220 may refer to the "system" described herein, and is associated factor, a financial institution that provides factoring as a service or holds an account associated with the factor, or another entity. The automated factoring system 220 may include any computerized apparatus that can be configured to perform any one or more of the functions of the automated factoring system 220 described and/or contemplated herein. In accordance with some embodiments, for example, the automated factoring system 220 may include a computer network, an engine, a platform, a server, a database system, a front end system, a back end system, a personal computer system, and/or the like. In some embodiments, such as the one illustrated in FIG. 2, the automated factoring system 220 includes a communication interface 222 (e.g., a network communication interface), a processor 224, and a memory 226, which includes a system application 229 and a datastore 228 stored therein. As shown, the communication interface 222 is operatively and selectively connected to the processor 224, which is operatively and selectively connected to the memory 226.

It will be understood that the system application 229 may be configured to implement any one or more portions of the various user interfaces and/or process flow described herein. The system application 229 may interact with the vendor application 238, the provider application, and/or the customer 250. It will also be understood that, in some embodiments, the memory includes other applications. It will also be understood that, in some embodiments, the system application 229 is configured to communicate with the datastore 228, the vendor system 230, the provider system 240, the customer 250, or the like.

It will be further understood that, in some embodiments, the system application 229 includes computer-executable program code portions for instructing the processor 224 to perform any one or more of the functions of the system application 229 described and/or contemplated herein. In some embodiments, the system application 229 may include and/or use one or more network and/or system communication protocols.

It will be understood that the datastore 228 may include any one or more storage devices, including, but not limited to, datastores, databases, and/or any of the other storage devices typically associated with a computer system. It will also be understood that the datastore 228 may store information in any known way, such as, for example, by using one or more computer codes and/or languages, alphanumeric character strings, data sets, figures, tables, charts, links, documents, and/or the like. Further, in some embodiments, the datastore 228 may include information associated with one or more applications, such as, for example, the system application 229. It will also be understood that, in some embodiments, the datastore 228 provides a substantially real-time representation of the information stored therein, so that, for example, when the processor 224 accesses the datastore 228, the information stored therein is current or substantially current.

As shown in FIG. 2, the memory 226 includes the system application 229. In some embodiments, the system application 229 includes an interface for communicating with, navigating, controlling, configuring, and/or using the automated factoring system 220. In some embodiments, the system application 229 includes computer-executable program code portions for instructing the processor 224 to perform one or more of the functions of the system application 229 described and/or contemplated herein. In some embodiments, the system application 229 may include and/or use one or more network and/or system communication protocols. Typically, the system application 229 is embodied as an application associated with a mobile device, an online web portal, or the like. The system application 229 may execute aspects of the process flow described in FIGS. 1A-1B.

In addition to the system application 229, the memory 226 also includes the datastore 228. As used herein, the datastore 228 may be one or more distinct and/or remote datastores. In some embodiments, the datastore 228 is not located within the system and is instead located remotely from the system. In some embodiments, the datastore 228 stores information or data described herein, including information associated with the vendor, the provider, and/or the factor, the transaction, or the like.

Each memory device described herein is configured to store information associated with the factor, the vendor, the provider, and/or the customer, transaction information, non-finalized and finalized information as disclosed above, and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more pieces of information and data used by the system in which it resides to implement the functions of that system.

Each communication interface described herein, including communication interfaces 222, 232, and 242, generally includes hardware, and, in some instances, software, that enables the automated factoring system 220, the vendor system 230, the provider system 240, and the customer 250 to transport, send, receive, and/or otherwise communicate information to and/or from the communication interface of one or more other systems on the network 210. For example, the communication interface 232 of the vendor system 230 may include a wireless transceiver, modem, server, electrical connection, and/or other electronic device that operatively connects the vendor system 230 to another system such as the automated factoring system 220. The wireless transceiver may include a radio circuit to enable wireless transmission and reception of information. Each processor described herein, including processors 224, 234, and 244, generally includes circuitry for implementing the audio, visual, and/or logic functions of the automated factoring system 220, the vendor system 230, and the provider system 240, respectively. For example, each processor may include a digital signal processor device, a microprocessor device, and various analog-to-digital converters, digital-to-analog converters, and other support circuits. Control and signal processing functions of the system in which the processor resides may be allocated between these devices according to their respective capabilities. Each processor may also include functionality to operate one or more software programs based at least partially on computer-executable program code portions thereof, which may be stored, for example, in a memory device, such as in the system application 229 of the memory 226 of the automated factoring system 220, the vendor application 238 of the memory 236 of the vendor system 230, and the provider application 248 of the provider memory 246 of the provider system 240.

As illustrated in FIG. 2, in accordance with some embodiments of the present invention, the vendor system 230 includes a communication interface 232, a processor 234, a memory 236 having a vendor application 238 stored therein, and a user interface 239. In such embodiments, the communication interface 232 is operatively and selectively connected to the processor 234, which is operatively and selectively connected to the user interface 239 and the memory 236. In some embodiments, the vendor may use the vendor application 238 to execute certain processes described with respect to the process flows described herein. Specifically, the vendor application 238 may executes aspects of the process flow described in FIG. 1A and FIG. 1B.

Also shown in FIG. 2, the memory 236 includes the vendor application 238. In some embodiments, the vendor application 238 includes an interface for communicating with, navigating, controlling, configuring, and/or using the vendor system 230. In some embodiments, the vendor application 238 includes computer-executable program code portions for instructing the processor 234 to perform one or more of the functions of the vendor application 238 described and/or contemplated herein. In some embodiments, the vendor application 238 may include and/or use one or more network and/or system communication protocols. Typically, the vendor application 238 is embodied as an application associated with a mobile device, an online web portal, or the like.

Also shown in FIG. 2 is the user interface 239. In some embodiments, the user interface 239 includes one or more output devices, such as a display and/or speaker, for presenting information to the vendor. In some embodiments, the user interface 239 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the vendor. In some embodiments, the user interface 239 includes the input and display devices of a mobile device, which are operable to receive and display information.

Also illustrated in FIG. 2, in accordance with some embodiments of the present invention, the provider system 240 includes a communication interface 242, a processor 244, a memory 246 having a provider application 248 stored therein, and a user interface 249. In such embodiments, the communication interface 242 is operatively and selectively connected to the processor 244, which is operatively and selectively connected to the user interface 249 and the memory 246. In some embodiments, the provider may use the provider application 248 to execute certain processes described with respect to the process flows described herein.

Also shown in FIG. 2, the memory 246 includes the provider application 248. In some embodiments, the provider application 248 includes an interface for communicating with, navigating, controlling, configuring, and/or using the provider system 240. In some embodiments, the provider application 248 includes computer-executable program code portions for instructing the processor 244 to perform one or more of the functions of the provider application 248 described and/or contemplated herein. In some embodiments, the provider application 248 may include and/or use one or more network and/or system communication protocols. Typically, the provider application 248 is embodied as an application associated with a mobile device, an online web portal, or the like.

Also shown in FIG. 2 is the user interface 249. In some embodiments, the user interface 249 includes one or more output devices, such as a display and/or speaker, for presenting information to the provider. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the provider. In some embodiments, the user interface 249 includes the input and display devices of a mobile device, which are operable to receive and display information. The factor and the customer 250 may also utilize user interfaces similar to user interfaces 239 and 249.

It will be understood that the embodiment of the system environment 200 illustrated in FIG. 2 is exemplary and that other embodiments may vary. As another example, in some embodiments, the automated factoring system 220 includes more, less, or different components. As another example, in some embodiments, some or all of the portions of the system environment 200 may be combined into a single portion. Likewise, in some embodiments, some or all of the portions of the automated factoring system 220 may be separated into two or more distinct portions.

In addition, the various portions of the system environment 200 may be maintained for and/or by the same or separate parties. It will also be understood that the automated factoring system 220 may include and/or implement any embodiment of the present invention described and/or contemplated herein. For example, in some embodiments, the automated factoring system 220 is configured to implement any one or more of the embodiments of the process flows described and/or contemplated herein in connection any process flow described herein. Additionally, the automated factoring system 220, the vendor system 230, the provider system 240, and/or the customer 250 are/is configured to initiate presentation of any of the user interfaces described herein. In some embodiments, the automated factoring system 220 may be configured to cause the vendor system 230 and/or the provider system 240 to initiate presentation of any of the user interfaces described herein.

The automated factoring system 220, the vendor system 230, the provider system 240, and/or the customer 250 may communicate via communication interfaces 222, 232, and 242 with a financial institution or one or more accounts associated with a financial institution via the network 210. For example, the automated factoring system 220 is associated with an account associated with the factor, the vendor system 230 is associated with an account associated with the vendor, the provider system 240 is associated with an account associated with the provider, and the customer 250 is associated with an account associated with the customer 250. Furthermore, the system environment 200 is configured to support the secure transfer of funds, virtual currency, messages, information, or the like between the vendor, the provider, and/or the factor, a financial institution, or any other entity, or devices associated with the aforementioned parties, via the network 210.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. For example, an automated factoring system module may include a calculation module configured to calculating the factor fee, the provider fee, the accelerated payment amount, the transaction amount, a non-finalized amount owed to the vendor by the provider, the finalized amount, and the reconciled amount. Such module may further include a reconciliation module configured to reconcile the finalized information received from the provider after processing. Such module may further include an offer module configured to generate messages and offers, including contract terms associated with the messages and offers, as well as transmit the messages or offers to at least one of the vendor, the provider, and/or the factor, or a device associated with the vendor, the provider, and/or the factor. Such module may further include a funds transfer module configured to transfer funds between the vendor, the provider, and/or the factor or accounts associated with the vendor, the provider, and/or the factor, or communicate with one or more financial institutions in regards to orchestrating a funds transfer.

As will be appreciated by one of ordinary skill in the art in view of this disclosure, the present invention may include and/or be embodied as an apparatus (including, for example, a system, machine, device, computer program product, and/or the like), as a method (including, for example, an electronic method, computer-implemented process, and/or the like), or as any combination of the foregoing. Accordingly, embodiments of the present invention may take the form of an entirely method embodiment, an entirely software embodiment (including firmware, resident software, micro-code, stored procedures in a database, or the like), an entirely hardware embodiment, or an embodiment combining method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium or storage medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the foregoing, this application hereby incorporates by reference the following applications in their entirety: U.S. patent application Ser. No. 14/738,135 for an Automated Factoring System (filed Jun. 12, 2015), and U.S. Patent Application Ser. No. 62/012,233 for an Automated Factoring System (filed Jun. 13, 2014).

The invention claimed is:

1. A system for providing factoring, automatically, based on non-finalized operation information, the system comprising:
a memory;
a processor;
a network communication interface; and a module stored in the memory, executable by the processor, and configured to:
- receive security credentials for establishing an operative communication channel with a provider computer system to receive non-finalized information from a provider, wherein the non-finalized information is associated with an operation completed by the provider on behalf of an entity;
- establish, via the network communication device, the operative communication channel with the provider computer system using the security credentials;
- receive, via the operative communication channel, the non-finalized information from the provider computer system;
- process the received non-finalized information, wherein processing the received non-finalized information comprises determining an accelerated transfer quantity based on the received non-finalized information, the accelerated transfer quantity being based on a non-finalized operation quantity owed by the provider to the entity and associated with the operation;
- present a first graphical user interface to an entity computing device of the entity, wherein the graphical user interface is presented to the entity computing device;
- present an offer to the entity computing device via the first graphical user interface, the offer comprising terms proposing that the accelerated transfer quantity be provided to the entity;
- determine that the entity has entered into a contract setting forth that the accelerated transfer quantity is provided to the entity by determining that the entity computing device has transmitted an acceptance of the offer via the first graphical user interface;
- transfer the accelerated transfer quantity to the entity;
- receive finalized information and/or a resource quantity associated with the operation from the provider;
- process the finalized information and/or resource quantity associated with the operation, wherein processing the finalized information associated with the operation comprises: (1) based on the finalized information and/or resource quantity, determining a finalized transfer quantity owed to the entity by the provider, associated with the operation, and (2) determining a reconciled transfer quantity based on the finalized transfer quantity and the accelerated transfer quantity; and
- transfer the reconciled transfer quantity to the entity.

2. The system according to claim 1, wherein:
the non-finalized information comprises at least an operation quantity; and
processing the received non-finalized information comprises determining the non-finalized operation quantity owed by the provider to the entity based on the operation quantity.

3. The system according to claim 1, wherein processing the received non-finalized information occurs substantially simultaneously to receiving the non-finalized information.

4. The system according to claim 1, wherein the finalized information is received after receiving the non-finalized information.

5. The system according to claim 1, wherein
the contract further sets forth that the entity sells its accounts receivable associated with the operation to a factor in exchange for the factor providing the accelerated transfer quantity.

6. The system according to claim 5, wherein the contract sets forth that the entity sells its future accounts receivable associated with future operations to the factor during a predefined time period in exchange for the factor providing periodic future accelerated transfers to the entity.

7. The system according to claim 1, wherein the module is further configured to:
- calculate a factor quantity; and
- wherein the contract sets forth that the accelerated transfer quantity is provided to the entity in exchange for the factor quantity;
- wherein determining the reconciled transfer quantity is further based on the factor quantity; and
- wherein the reconciled transfer quantity is equal to the finalized transfer quantity minus the accelerated transfer quantity minus the factor quantity.

8. A method for providing factoring, automatically, based on non-finalized operation information, the method comprising:
- receiving, with a computer processor, security credentials for establishing an operative communication channel with a provider computer system to receive non-finalized information from a provider, wherein the non-finalized information is associated with an operation completed by the provider on behalf of an entity;
- establishing, with a computer processor, the operative communication channel with the provider computer system using the security credentials, wherein the operative communication channel is established using the network communication interface;
- receiving, with a computer processor, the non-finalized information from the provider computer system via the operative communication channel;
- processing, with a computer processor, the received non-finalized information, wherein processing the received non-finalized information comprises determining an accelerated transfer quantity based on the received non-finalized information, the accelerated transfer quantity being based on a non-finalized operation quantity owed by the provider to the entity and associated with the operation;
- presenting, with a computer processor, a first graphical user interface to an entity computing device of the entity, wherein the graphical user interface is presented to the entity computing device;
- presenting, with a computer processor, an offer to the entity computing device via the first graphical user interface, the offer comprising terms proposing that the accelerated transfer quantity be provided to the entity;
- determining, with a computer processor, that the entity has entered into a contract setting forth that the accelerated transfer quantity is provided to the entity by determining that the entity computing device has transmitted an acceptance of the offer via the first graphical user interface;
- transferring, with a computer processor, the accelerated transfer quantity to the entity;
- receiving, with a computer processor, finalized information and/or a resource quantity associated with the operation from the provider;
- processing, with a computer processor, the finalized information and/or resource quantity associated with the operation, wherein processing the finalized information associated with the operation comprises: (1) based on the finalized information and/or resource quantity, determining a finalized transfer quantity owed to the entity by the provider and associated with the operation, and (2) determining a reconciled transfer quantity based on the finalized transfer quantity and the accelerated transfer quantity; and transferring the reconciled transfer quantity to the entity.

9. The method according to claim 8, wherein:

the non-finalized information comprises at least an operation quantity; and processing the received non-finalized information comprises determining the non-finalized operation quantity owed by the provider to the entity based on the operation quantity.

10. The method according to claim 8, wherein processing the received non-finalized information occurs substantially simultaneously to receiving the non-finalized information.

11. The method according to claim 8, wherein the finalized information is received after receiving the non-finalized information.

12. The method according to claim 8, wherein the contract sets forth that the entity sells its future accounts receivable associated with future operations to a factor during a predefined time period in exchange for the factor providing periodic future accelerated transfers to the entity.

13. A computer program product for providing factoring, automatically, based on non-finalized operation information, the computer program product comprising a non-transitory computer-readable medium comprising code causing an apparatus to:

receive security credentials for establishing an operative communication channel with a provider computer system to receive non-finalized information from a provider, wherein the non-finalized information is associated with an operation completed by the provider on behalf of an entity;

establish the operative communication channel with the provider computer system using the security credentials, wherein the operative communication channel is established using the network communication interface;

receive the non-finalized information from the provider computer system via the operative communication channel;

process the received non-finalized information, wherein processing the received non-finalized information comprises determining an accelerated transfer quantity based on the received non-finalized information, the accelerated transfer quantity being based on a non-finalized operation quantity owed by the provider to the entity and associated with the operation;

present a first graphical user interface to an entity computing device of the entity, wherein the graphical user interface is presented to the entity computing device;

present an offer to the entity computing device via the first graphical user interface, the offer comprising terms proposing that the accelerated transfer quantity be provided to the entity;

determine that the entity has entered into a contract setting forth that the accelerated transfer quantity is provided to the entity by determining that the entity computing device has transmitted an acceptance of the offer via the first graphical user interface;

transfer the accelerated transfer quantity to the entity;

receive finalized information and/or a resource quantity associated with the operation from the provider;

process the finalized information and/or resource quantity associated with the operation, wherein processing the finalized information associated with the operation comprises: (1) based on the finalized information and/or resource quantity, determining a finalized transfer quantity owed to the entity by the provider and associated with the operation, and (2) determining a reconciled transfer quantity based on the finalized transfer quantity and the accelerated transfer quantity; and transfer the reconciled transfer quantity to the entity.

14. The computer program product according to claim 13, wherein:

the non-finalized information comprises at least an operation quantity; and processing the received non-finalized information comprises determining the non-finalized operation quantity owed by the provider to the entity based on the operation quantity.

15. The computer program product according to claim 13, wherein processing the received non-finalized information occurs substantially simultaneously to receiving the non-finalized information.

16. The computer program product according to claim 13, wherein the finalized information is received after receiving the non-finalized information.

17. The computer program product according to claim 13, wherein the contract sets forth that the entity sells its future accounts receivable associated with future operations to a factor during a predefined time period in exchange for the factor providing periodic future accelerated transfers to the entity.

* * * * *